United States Patent [19]

Johnson

[11] 3,967,855
[45] July 6, 1976

[54] AUTOMOBILE WHEEL COVER

[76] Inventor: Odean J. Johnson, 1200 S. Cester, Park Ridge, Ill. 60068

[22] Filed: July 28, 1975

[21] Appl. No.: 599,528

[52] U.S. Cl............................ 301/37 R; 301/37 SA
[51] Int. Cl.² ............................................ B60B 7/00
[58] Field of Search............ 301/37 R, 37 AT, 37 P, 301/37 CM, 37 SS, 37 C, 37 CD, 37 TP, 37 PB, 37 S, 37 B, 37 SA, 37 H, 108 R, 108 A, 108 S, 108 SC; 24/73 HC; 29/159 A

[56] References Cited
UNITED STATES PATENTS
2,711,349  6/1955  Grouen............................ 301/37 SS

*Primary Examiner*—Stanley H. Tollberg
*Assistant Examiner*—D. W. Keen
*Attorney, Agent, or Firm*—Edmond T. Patnaude

[57] ABSTRACT

A wheel cover fits against and is secured to a wheel by means of the wheel bolts and an annular spoke member fits over and is secured to the wheel cover to provide a simulated wire wheel.

8 Claims, 2 Drawing Figures

U.S. Patent July 6, 1976 3,967,855
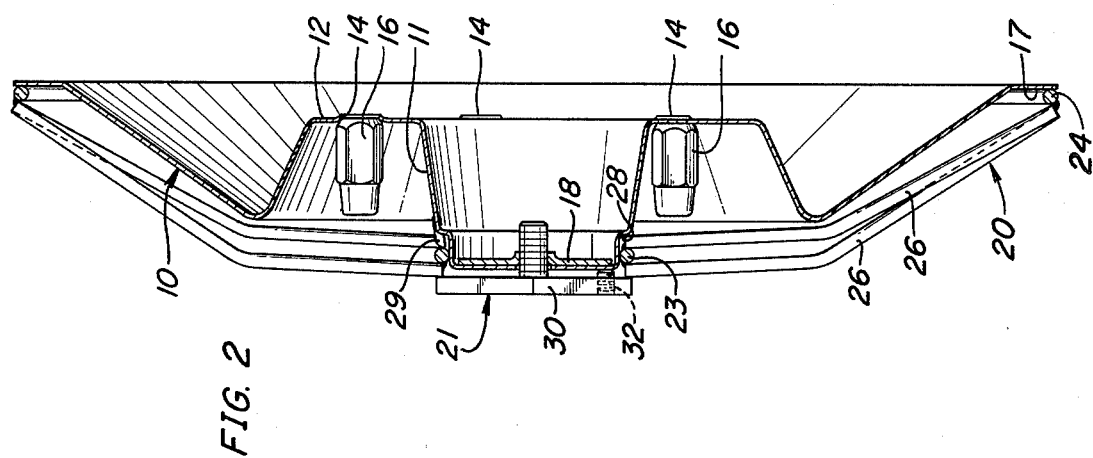
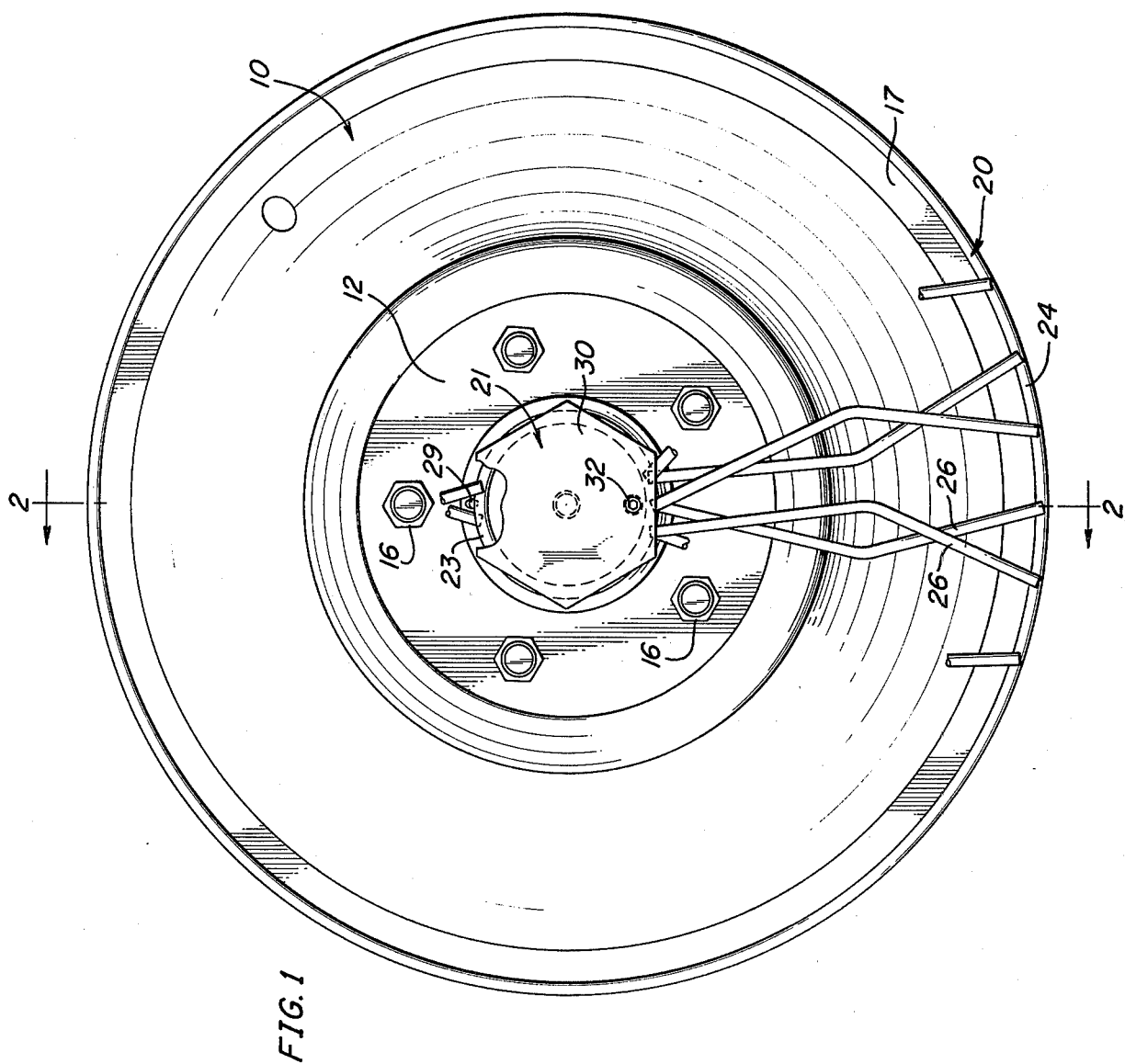

AUTOMOBILE WHEEL COVER

The present invention relates in general to ornamental wheel covers and it relates in particular to a wheel cover assembly which attaches to the wheel by the usual wheel bolts.

Briefly, the subject invention provides a wheel cover assembly which has a rich attractive appearance, is easily assembled to an automobile wheel, cannot be accidentally lost or easily stolen, and in accordance with one aspect of the invention simulates a wire spoke wheel. The present wheel cover assembly incorporates a first integral part which fits over the wheel and is secured thereto by the usual wheel bolts whereby such part will not become spuriously disassembled from the wheel. A second part is formed of wire and is attached to the center portion of the first part by a threaded member which is adapted to be locked in place. The second part is used when a wire spoke wheel is to be simulated, but the first part can be used without the wire part if desired.

BRIEF DESCRIPTION OF THE DRAWING

Further objects and advantages and a better understanding of the present invention can be had by reference to the following detailed description wherein;

FIG. 1 is an elevational view of a wheel cover assembly embodying the present invention, the wire wheel simulating part being partially broken away; and FIG. 2 is a sectional view of the wheel cover assembly of FIG. 1 taken along the line 1—1 thereof.

DETAILED DESCRIPTION OF THE INVENTION

Referring to the drawing, a circular integral wheel cover part 10 is suitably formed of a metal, such as, for example, stainless steel and includes a cup-like central section 11 which fits over the end of the spindle or axle to which the associated wheel (not shown) is mounted. The part 10 may be suitably formed in a stamping, spinning or drawing operation. An intermediate section of the part 10 provides an annular trough having a planar annular bottom surface 12 which is adapted to abut against the flat annular area of the associated wheel in the vicinity of the wheel bolts. A plurality of angularly spaced holes 14 are provided in the annular section 12 for reception of the wheel bolts or studs which mount the associated wheel to the vehicle. The areas of the section 12 surrounding the holes 14 are depressed to fit into the correspondingly depressed areas surrounding the bolt holes in the corresponding wheel thereby interlocking the part 10 to the wheel and preventing relative rotation between the member 10 and the associated wheel. A plurality of nuts 16 have threaded blind holes therein for receiving the distal ends of the wheel bolts to mount both the member 10 and the associated wheel. It may be seen in FIG. 2 that the inner ends of the nuts 16 are convex to match the concave outer surfaces of the part 10 surrounding the bolt holes. The annular peripheral portion 17 of the cover part 10 is also planar to abut firmly against the rim portion of the associated wheel adjacent the rim. A circular nut plate 18 is spot welded to the inside surface of the central portion of the wheel cover part 10 and has a threaded, centrally located aperture therein.

In order to simulate a wire spoke wheel, an annular, wire member 20, only partially shown in FIG. 1, may be positioned over the solid part 10 and secured thereto by a centrally disposed ornamental screw 21. Considered in greater detail, the member 20 comprises an inner circular wire ring 23 and an outer circular wire ring 24. The outer diameter of the outer ring 24 is substantially equal to the outer diameter of the part 10 and fits against the annular portion 17 thereof. The inner diameter of the inner ring 23 is slightly larger than the outer diameter of the outer portion of the cup-shaped central section 11 so as to fit thereover as best shown in FIG. 2. A plurality of identical wire members 26 are each centrally bent at an angle of about 123° and welded at opposite ends to the rings 23 and 24 respectively. It will be noted that members 26 are arranged in pairs and that the outer ends of all of the members 26 lie against the outer side of the outer ring 24 but the inner ends of adjacent ones of the wires are alternately positioned inside and outside the inner ring 23. Twenty-one pairs of the wire members 26 are provided in the embodiment of the invention shown in FIG. 1. As best shown in FIG. 2, the cup-shaped portion 11 of the part 10 is provided with an outwardly facing shoulder 28 against which alternate ones of the wire members 26 abut. A rigid tab 29 is welded to the part 10 and extends axially out from the shoulder 28 between adjacent ones of the wire members 26 to prevent rotation of the wire part 20 relative to the solid part 10.

As shown in FIG. 2, when the annular wire member 20 is fitted onto the solid wheel cover part 10, the inner ends of the outer ones of the wire members 26 extend a short distance outwardly from the central end surface of the part 10 whereby the inner face of the head 30 of the screw 21, when tightened down, engages alternate ones of the wires 26 to hold the inner portion of the wire piece 20 firmly against the shoulder 28 to prevent any play therebetween. The screw head 30 is provided with a threaded opening receiving a set screw 32 which can be tightened against the central surface of the part 10 to prevent spurious rotation of the screw and accidental disassembly of the wheel cover.

If desired, the wire part 20 need not be used. When the part 20 is not used the screw 21 is simply tightened down against the central portion of the piece 10 and the screw 32 is tightened to prevent spurious disassembly of the wheel cover. The head 30 of the screw is sufficiently large to completely cover the circular end portion of the wheel cover part 10.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. An ornamental cover for a wheel of an automotive vehicle, comprising
    a circular member having a cup-shaped central portion and a planar annular peripheral portion,
    said member having an intermediate annular planar portion provided with a plurality of spaced holes for receiving the bolts on which said wheel is mounted,
    said planar portion being deformed inwardly around each of said holes,
    said member being provided with an internally threaded axial hole, and a screw member threaded into said axial hole, said screw member having a head having a minimum crosswise dimension not substantially less than the external diameter of said cup-shaped central portion.

2. An ornamental cover for a wheel according to claim 1 and further comprising an annular member formed of wire and fitted over said circular member with the peripheral portion of said annular member lying against said planar peripheral portion of said circular member, and the inner central portion of said annular member being clamped between said head of said screw member and said cup-shaped central portion of said circular member.

3. An ornamental cover for a wheel according to claim 2 wherein said annular member comprises inner and outer rigid circular rings, a plurality of identical wire members each bent in the middle and secured at the ends to the respective rings, the central portions of said wire members being disposed in overlapping relationship.

4. An ornamental cover for a wheel according to claim 3 wherein the inner ends of the overlapping ones of said wire members are respectively disposed on the inner and outer sides of the inner one of said rings.

5. An ornamental cover for a wheel according to claim 4 wherein the outer peripheral portion of said cup-shaped portion has a reduced external diameter to receive said inner ring and to provide an annular shoulder against which those inner end portions of the wire members which are disposed on the inner side of said inner ring rest.

6. An ornamental cover for a wheel according to claim 5 comprising tab means on said shoulder extending adjacent inner ones of said wires for preventing relative rotation between said wire member and said circular member.

7. An ornamental cover for a wheel according to claim 1 comprising locking means carried by said screw for locking said screw to said circular member to prevent relative rotation between said circular and annular members.

8. An ornamental cover for a wheel according to claim 7 wherein said locking means comprises a set screw.

* * * * *